Figure 1:
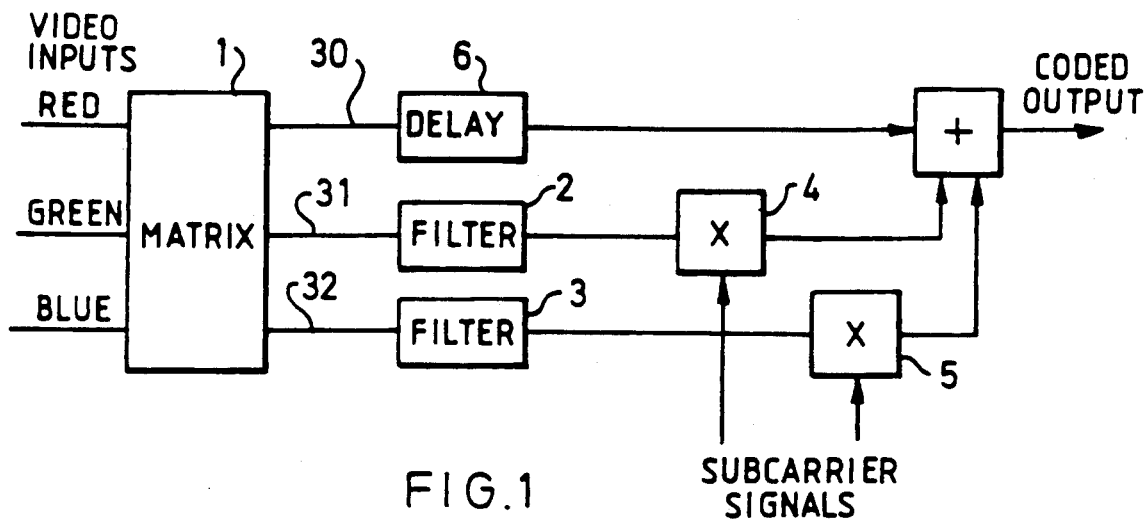

United States Patent [19]

Robinson

[11] Patent Number: 5,047,841

[45] Date of Patent: Sep. 10, 1991

[54] ENCODER FOR TELEVISION SIGNALS

[76] Inventor: Roger N. Robinson, 3 Montpellier Court, St. Leonards Road, Windor, Berkshire, United Kingdom

[21] Appl. No.: 264,217

[22] Filed: Oct. 28, 1988

[51] Int. Cl.⁵ .................... H04N 11/12; H04N 9/78
[52] U.S. Cl. .................................................. 358/31
[58] Field of Search ........................................ 358/31

[56] References Cited

U.S. PATENT DOCUMENTS

| | | | |
|---|---|---|---|
| 4,389,665 | 6/1983 | Nagao et al. | 358/31 |
| 4,417,270 | 11/1983 | Nagao et al. | 358/23 |
| 4,638,351 | 1/1987 | Clarke | 358/38 |
| 4,656,502 | 4/1987 | Hansdorfer | 358/31 |
| 4,731,660 | 3/1988 | Farondja et al. | 358/31 |

FOREIGN PATENT DOCUMENTS

| | | | |
|---|---|---|---|
| 806391 | 12/1958 | United Kingdom | 358/31 |
| 1244825 | 9/1971 | United Kingdom | |
| 2035751 | 6/1980 | United Kingdom | |
| 2101835 | 1/1983 | United Kingdom | |
| 2127250 | 4/1984 | United Kingdom | |

Primary Examiner—John W. Shepperd
Attorney, Agent, or Firm—Ostrolenk, Faber, Gerb & Soffen

[57] ABSTRACT

An encoder for encoding color video signals into a composite color video signal comprises a matrix 1 for providing luminance and color difference signals. Modulators 4, 5 modulate a chrominance signal. The luminance signal is supplied to a filter 7 controlled by a control circuit 8 so that, when luminance signal components at or near the sub-carrier frequency are detected by the circuit 8, they are attenuated by the filter 7.

7 Claims, 4 Drawing Sheets

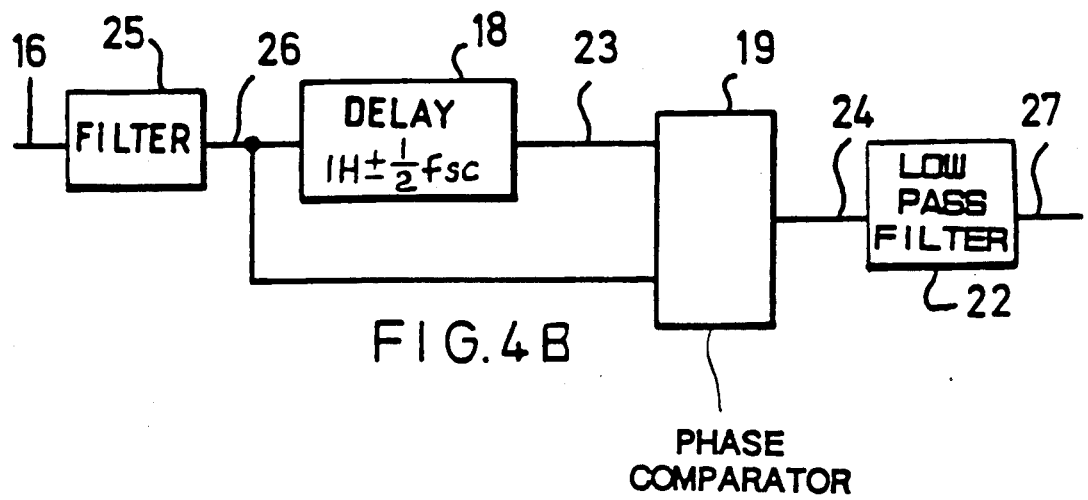

ENCODER FOR TELEVISION SIGNALS

This patent application relates to the encoding of the primary Red, Green and Blue color component television signals into a composite color video signal in either NTSC or PAL systems.

The improvements which are the subject of this invention result in improved picture quality when the signal is decoded in the receiver; in particular when compared with a conventional encoder there is a reduction in the generation of spurious color signals in the receiver caused by fine luminance picture detail.

An encoded color television signal is made up of three components derived from the R,G and B signals: the luminance signal, which carries picture brightness information and two color difference signals which define the picture hue and saturation.

In both NTSC and PAL television systems the two color difference signals are each used to amplitude modulated subcarriers of equal frequency using quadrature modulation; when combined together in equal amplitudes, the resulting signal is referred to as a chrominance signal. In the PAL system the subcarrier used for one of the color difference signals is inverted on alternate lines of the television picture.

In either system the subcarrier frequency is within the frequency spectrum occupied by the luminance signal. When the signal is decoded in the receiver, luminance signal information can be incorrectly decoded as color information giving rise to spurious color appearing in areas of fine picture detail. The invention describes methods of filtering the luminance signal to reduce the generation of spurious color in the receiver.

The subcarrier frequency chosen for NTSC color systems is related to the television line scanning frequency by the equation $f_{sc}=(n+\frac{1}{2})f_h$ where $f_{sc}$ is the subcarrier frequency, $f_h$ is the line scanning frequency and n is an integer. The subcarrier frequency is therefore offset from a multiple of line frequency by one half of the line frequency.

In a PAL television signal the subcarrier frequency is however offset from a multiple of line frequency by one quarter of line frequency. The offset together with the phase reversal of the polarity of the subcarrier used for modulating one of the color difference signals causes the spectrum of the modulated subcarrier to be centered on frequencies given by $f_{sc}=f_h(n\pm\frac{1}{4})$.

FIG. 1 shows a simplified block diagram of a conventional encoder. The red, green and blue inputs are matrixed in matrix 1 to provide a luminance signal 30 and two color difference signals 31 and 32. The color difference signals are low pass filtered, 2 and 3 and fed to two modulators 4 and 5. The luminance signal is delayed by delay line 6 to provide an output timed coincidently with the output of the modulators. The delayed luminance signal is then added to the output of the modulators to provide a composite video signal.

Figure 2:
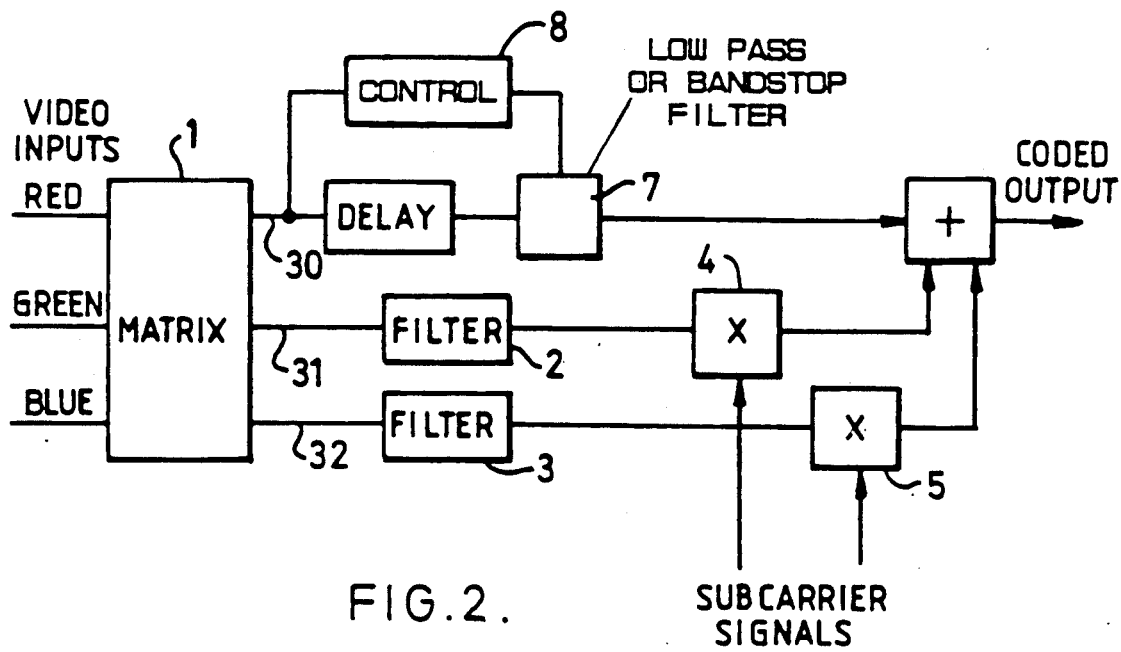

FIG. 2 shows a block diagram of a coder incorporating the invention. This is similar to FIG. 1 with the addition of, firstly, a voltage controlled filter 7 and a control circuit 8. The incorporation of the voltage controlled filter and control circuit are the subject of this patent application, and will be described in more detail.

The voltage controlled filter may be either a band-stop filter or a low-pass filter. In either case it would be the stop-band which should include the color subcarrier frequency. The attenuation of the filter within its stopband is a function of the control input from control circuit 8.

Figure 3:
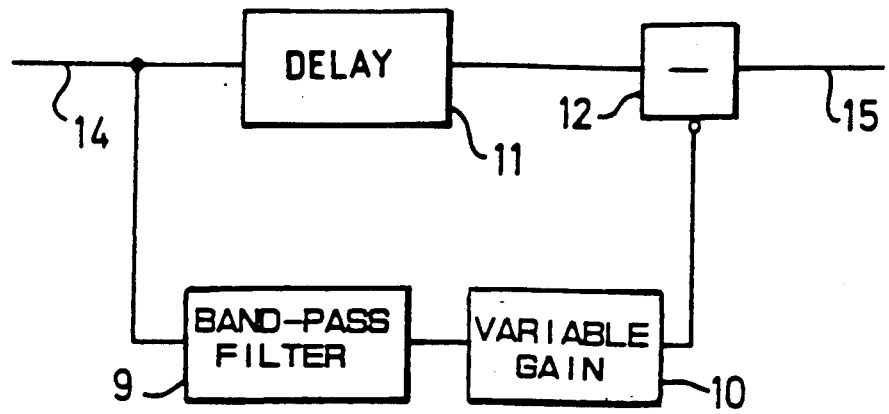

There are many ways in which the variable filter can be constructed, FIG. 3 shows one such method. In FIG. 3 the input signal 14 is applied to band-pass filter 9 and delay line 11. Filter 9 is designed to pass frequencies around that of the color subcarriers. The output of the filter 9 is connected to a variable gain device 10. Delay line 11 has a delay time equal to the sum of the delays of filter 9 and variable gain device 10. The output of the variable gain device 10 is subtracted from the output of delay line 11 to provide an output 15. If the gain of variable gain device 10 is varied from zero to unity then the response between input 14 and output 15 will be that of a band-stop filter with peak stop-band attenuation varying from zero to infinity.

The purpose of the control circuit 8 of FIG. 2 is to detect the presence of luminance information which would coincide with the spectrum of the modulated chrominance information and in the presence of such luminance to provide a control signal to variable filter 7 so as to cause its stop-band attenuation to be increased. The construction of this control circuit is different for the NTSC or PAL television systems.

A circuit for the NTSC system is shown in FIG. 4.

The input to the circuit is fed with a luminance video signal 16 filtered in filter 25 designed so as to pass signals close to the color subcarrier frequency. The output 26 from this filter is applied to a delay circuit 18 which has a delay closely approximating to one television line period which corresponds to $(n+\frac{1}{2})$ cycles of subcarrier of an NTSC signal where n is an integer. The output signal 23 of the delay circuit together with filtered input signal 26 is applied to a phase comparator 19. The output of the phase comparator 19 is a measure of the phase difference between input signals 23 and 26. The output of the phase comparator may then be filtered by low pass filter 22 to provide an output signal 27 which is used to control the variable filter.

One commonly used phase comparator is a multiplier which, for sinusoidal input signals A sin $(\omega t+x)$ and B sin $(\omega t+y)$, will provide an output which when filtered to remove frequencies of $2\omega t$ provides an output signal of cos $(x-y)$.

Figure 4A:
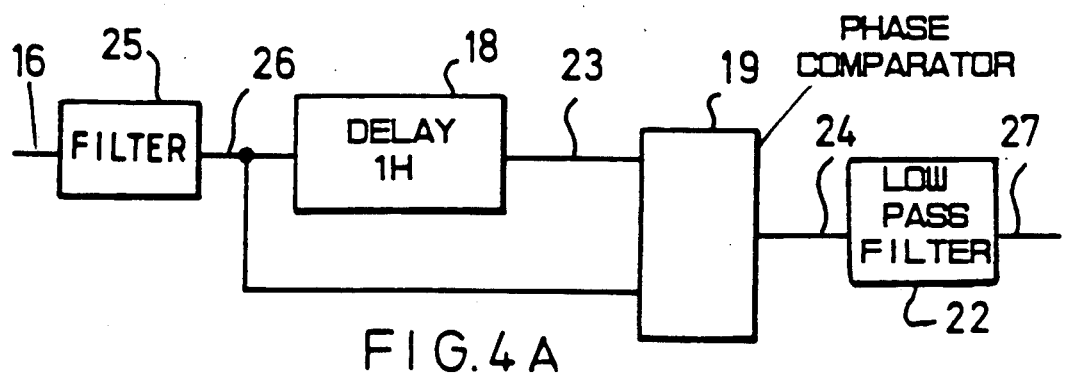
Figure 5:
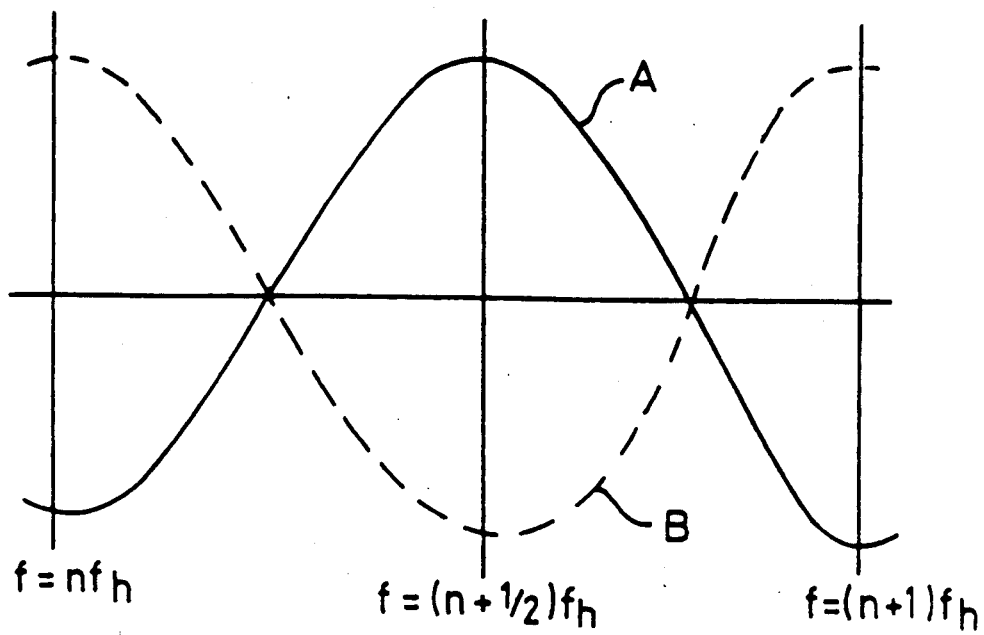

When used in the circuit of FIG. 4A the output 27 will vary with frequency as shown in curve A FIG. 5. The output reaches a maximum when the input frequency, f, is equal to $(n+\frac{1}{2})$f corresponding to the color subcarrier frequency and the normal maxima of the NTSC chrominance spectrum.

Luminance signals containing such frequencies thus provide an output signal 27 from the control circuit causing these frequencies to be attenuated by variable filter 7.

An alternative means, as shown in FIG. 4B, would use a delay circui 18 whose delay closely approximates to one television line period plus or minus one half of the period of one cycle of the subcarrier frequency. The delay in this case would correspond to an integer number of cycles of subcarrier. In this case the output 27 from the circuit would correspond to curve B of FIG. 5. In this case a negative output signal 27 would be used to increase the attenuation of variable filter 7.

Figure 6:
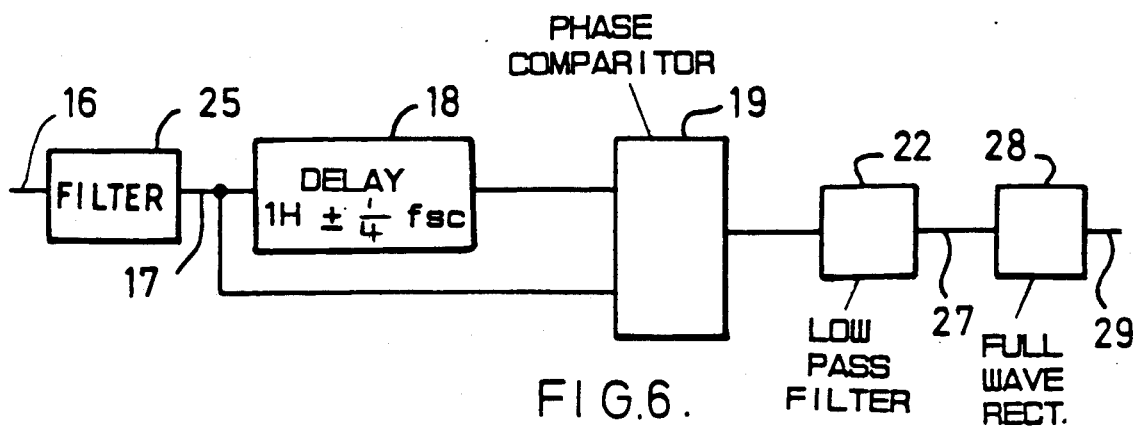

For the PAL television system a control circuit is shown in FIG. 6. This circuit is similar to FIG. 4 except the delay of the delay circuit is equal to the period of one television line plus or minus the period of one quarter of a cycle of color subcarrier. Also the output signal 27 from the filter 22, is applied to a full wave rectifier 28 to provide an output signal 29 which is used to control the variable filter 7.

Referring to FIG. 6, the luminance input signal 16 to the control circuit is filtered in filter 25 to select frequencies close to that of the colors subcarrier. The output 17 from filter 25 is applied to delay line 18 whose length approximates to one television line period plus or minus one quarter of a cycle of subcarrier. The output from delay line 18 together with the filtered luminance signal, 17, are applied to phase comparator 19. The output from the phase comparator is filtered in filter 22. The resulting output signal 27 is full-wave rectified in rectifier 28 to provide an output control signal 29 which is used to control the variable filter 7 shown in FIG. 2.

Figure 7:
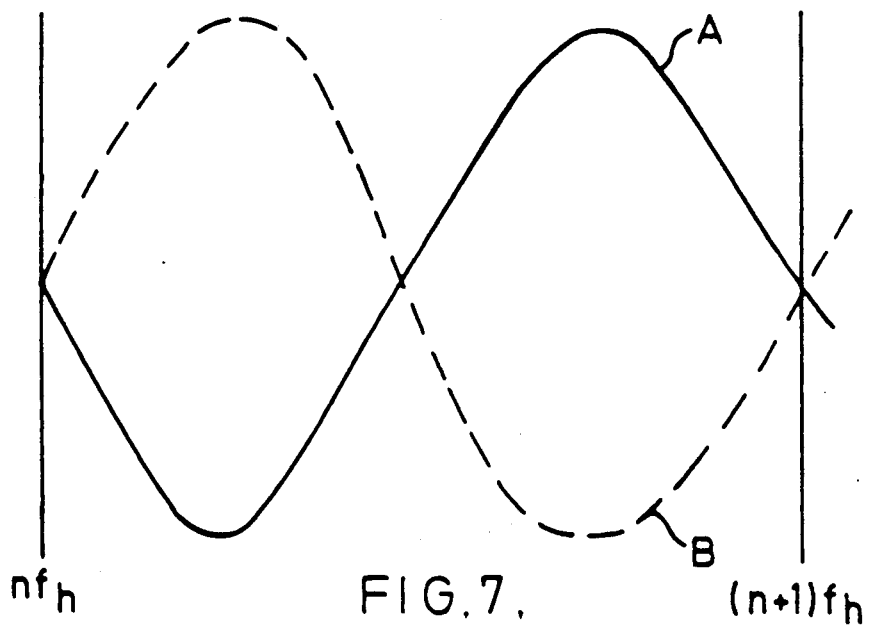
Figure 8:
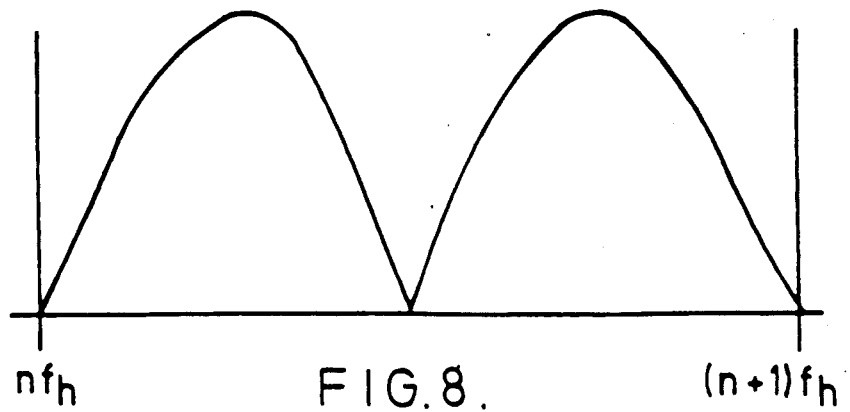

The operation of this circuit is shown in FIGS. 7 and 8. The output signal 27 from the phase detector after filtering in filter 22 will be a signal which will vary according to the relative phases of the signals at the input and output of delay circuit 18. This will vary with frequency as shown in FIG. 7. Curve A of FIG. 7 shows the output signal filtered from the phase comparator as a function of input frequency if the delay of delay circuit 18 corresponds to the period of an integer number cycles of subcarrier which is normally equal to a delay period of one television line plus one quarter of the period of one cycle of subcarrier. Curve B shows the corresponding output if the delay corresponds to the period of $(n+\frac{1}{2})$ cycles of subcarrier, ie normally the period of one television line minus the period of one quarter of one cycle of subcarrier.

The signal 27, shown as a function of frequency in FIG. 7, is the input to full wave rectifier 28. The output signal 29 from the rectifier is shown in FIG. 8 and is shown for a positive output rectifier although a negative output rectifier could be used. This signal reaches a maximum value when the input signal to the circuit is at a frequency of either $f_h(n+\frac{1}{4})$ or $f_h(n-\frac{1}{4})$. These frequencies correspond to the peaks of the spectrum of the chrominance signal of the PAL color system. The output signal 29 would increase the attenuation of variable filter 7 of FIG. 2 if these frequencies are present in the luminance signal.

I claim:

1. An encoder for encoding color video signals into a composite color video signal, comprising:
   means for producing a luminance signal,
   means for producing a chrominance signal by modulating a subcarrier;
   a first filter for attenuating components of the luminance signal at or adjacent the frequency of the sub-carrier;
   a control means for controlling said first filter, said control means comprising a second filter for passing luminance signal components around the subcarrier frequency, first means for delaying the output from said second filter and a phase comparator for comparing the output from said second filter and the output from said first delay means; and
   means for combining the output of the first filter with the chrominance signal.

2. An encoder as claimed in claim 1, in which said first delay means delays the output from said second filter by a time substantially equal to one television line period.

3. An encoder as claimed in claim 1, in which said first delay means delays the output from said second filter by a time substantially equal to one television line period plus or minus half the period of the sub-carrier.

4. An encoder as claimed in claim 1, in which said first delay means delays the output from said second filter by a time substantially equal to one television line period plus or minus a quarter of the period of the sub-carrier, and the encoder further comprises a rectifier for full wave rectifying the output signal of the phase comparator.

5. An encoder as claimed in claim 1, in which said first filter comprises a low pass filter.

6. An encoder as claimed in claim 1, in which said first filter comprises a bandstop filter.

7. An encoder as claimed in claim 6, in which the bandstop filter comprises a first channel comprising a first bandpass filter for passing luminance signal components having frequencies around the sub-carrier frequency and a variable gain device, a second channel comprising second delay means for delaying the luminance signal by a time substantially equal to the delay time of the first channel, and substracting means for forming the difference between the output signals of the first and second channels.

* * * * *

UNITED STATES PATENT AND TRADEMARK OFFICE
CERTIFICATE OF CORRECTION

PATENT NO. : 5,047,841

DATED : September 10, 1991

INVENTOR(S) : Roger N. Robinson

It is certified that error appears in the above-identified patent and that said Letters Patent is hereby corrected as shown below:

On the title page, item (73) insert:

--Assignee: Vistek Electronics Limited--

Signed and Sealed this

Seventeenth Day of August, 1993

Attest:

BRUCE LEHMAN

Attesting Officer

Commissioner of Patents and Trademarks